United States Patent
Finley et al.

(10) Patent No.: US 7,947,931 B2
(45) Date of Patent: May 24, 2011

(54) SYSTEM AND METHOD FOR SHAFT HEAT TREAMENT FOR CORRECTION SLOW ROLL

(75) Inventors: William Finley, Cincinnati, OH (US); Mark Hodowanec, Lessburg, VA (US)

(73) Assignee: Siemens Industry, Inc., Alpharetta, GA (US)

( * ) Notice: Subject to any disclaimer, the term of this patent is extended or adjusted under 35 U.S.C. 154(b) by 169 days.

(21) Appl. No.: 12/399,371

(22) Filed: Mar. 6, 2009

(65) Prior Publication Data

US 2009/0177328 A1    Jul. 9, 2009

Related U.S. Application Data

(62) Division of application No. 11/236,444, filed on Sep. 27, 2005, now Pat. No. 7,635,828.

(60) Provisional application No. 60/614,808, filed on Sep. 30, 2004.

(51) Int. Cl.
    *H05B 1/02*    (2006.01)

(52) U.S. Cl. ............. 219/494; 219/497; 72/76; 324/227

(58) Field of Classification Search .............. 219/494, 219/497; 324/227; 72/76
    See application file for complete search history.

(56) References Cited

U.S. PATENT DOCUMENTS

| | | | | |
|---|---|---|---|---|
| 3,986,380 | A * | 10/1976 | Biggs | 72/76 |
| 4,460,869 | A * | 7/1984 | Buser et al. | 324/200 |
| 6,741,074 | B2 * | 5/2004 | DeBlock et al. | 324/227 |
| 7,112,762 | B2 * | 9/2006 | Finley et al. | 219/201 |

* cited by examiner

*Primary Examiner* — Mark H Paschall
(74) *Attorney, Agent, or Firm* — Filip A. Kowalewski

(57) ABSTRACT

Certain exemplary embodiments comprise an computer readable storage device having instructions stored therein that are indicative of reducing slow roll electrical runout value of a shaft of an electric motor, the shaft having a runout sensing area; the instructions including determining an electrical runout value for the runout sensing area; rotating the shaft; determining the temperature range and time interval for heating the runout sensing area of the shaft sufficient to reduce the electrical runout value; and heating the shaft sensing area during shaft rotation at the calculated temperature range for the calculated time interval.

18 Claims, 4 Drawing Sheets

SYSTEM AND METHOD FOR SHAFT HEAT TREAMENT FOR CORRECTION SLOW ROLL

CROSS-REFERENCES TO RELATED APPLICATIONS

This application is a divisional of, claims priority to, and incorporates by reference herein in its entirety, Ser. No. 11/236,444, filed Sep. 27, 2005, now U.S. Pat. No. 7,635,828, which claims priority to U.S. Provisional Patent Application 60/614,808, filed 30 Sep. 2004.

BACKGROUND

Rotating equipment can be utilized in many manufacturing applications. Rotating equipment failures can cause lost production time, injury to personnel, and/or loss of capital equipment. One possible cause of rotating equipment failure can be failures due to excessive vibrations. Accordingly, some rotating equipment can be operated with at least one proximity probe, such as an eddy current proximity probe that can be adapted to continually monitor vibrations (e.g., radial displacements of a rotating part) to detect vibration values in excess of a predetermined threshold.

Proximity probes or proximity measuring systems can be used for the measurement, monitoring, and/or analysis of axial and/or radial shaft vibration (peak-to-peak displacement amplitude) in rotating machinery. A proximity probe or transducer can be placed in a position defined by a mount. Read-outs from proximity probes, such as via oscilloscope, meter, and/or x-y recorder, might not provide an accurate indication of the shaft motion relative to the proximity probe or transducer.

Instead, data provided by the probe can reflect movement of the shaft relative to the probe, electrical properties of the shaft, and/or inaccuracies generated by the probe itself. The impact of shaft movement can be referred to as "mechanical runout". The impact of the electrical properties of the shaft can be referred to as "electrical runout". The impact of the probe's inaccuracies can be referred to as "probe noise".

Eddy current proximity probes can derive distances, such as proximities, utilizing induced electrical currents in the material of the rotating part. Some level of inaccuracy in the values obtained from the probe can be present, however, which can be due to any number of factors, such as instrumentation error, mechanical runout, and/or electrical runout, etc., any of which can vary with measurement location. Electrical runout, often called glitch, can result from variations in electrical properties of the shaft material.

Causes for mechanical runout can comprise aberrations in cross-sectional shape and/or axial flatness, etc., bearing hydrostatic effects, bearing hydrodynamic effects, etc.

A possible test procedure, to assess inaccuracies comprised in values obtained from the probe, can involve rotating a shaft at a speed below and/or far below a normal operating speed. Such a test procedure can be referred to as a "slow roll" test. A displacement signal that a proximity probe provides during a slow roll test can be called a "slow roll value".

Rotating equipment can have a maximum specified slow roll value above which the rotating equipment is considered inoperable since the slow roll can mask shaft movement due to dynamically variable vibration. Hence a system and method to reduce electrical runout in shafts to reduce slow roll is disclosed.

SUMMARY

Certain exemplary embodiments comprise systems and methods for providing a heat treatment procedure to reduce a slow roll value of a proximity probe sensing area of a shaft. In certain exemplary embodiments the heat treatment procedure can improve shaft homogeneity and decrease measurement variations in the proximity probe sensing area. Reducing the slow roll value of the sensing area of the shaft can reduce proximity probe sensing errors.

BRIEF DESCRIPTION OF THE DRAWINGS

A wide variety of potential embodiments will be more readily understood through the following detailed description of certain exemplary embodiments, with reference to the accompanying exemplary drawings in which.

DEFINITIONS

Figure 1:
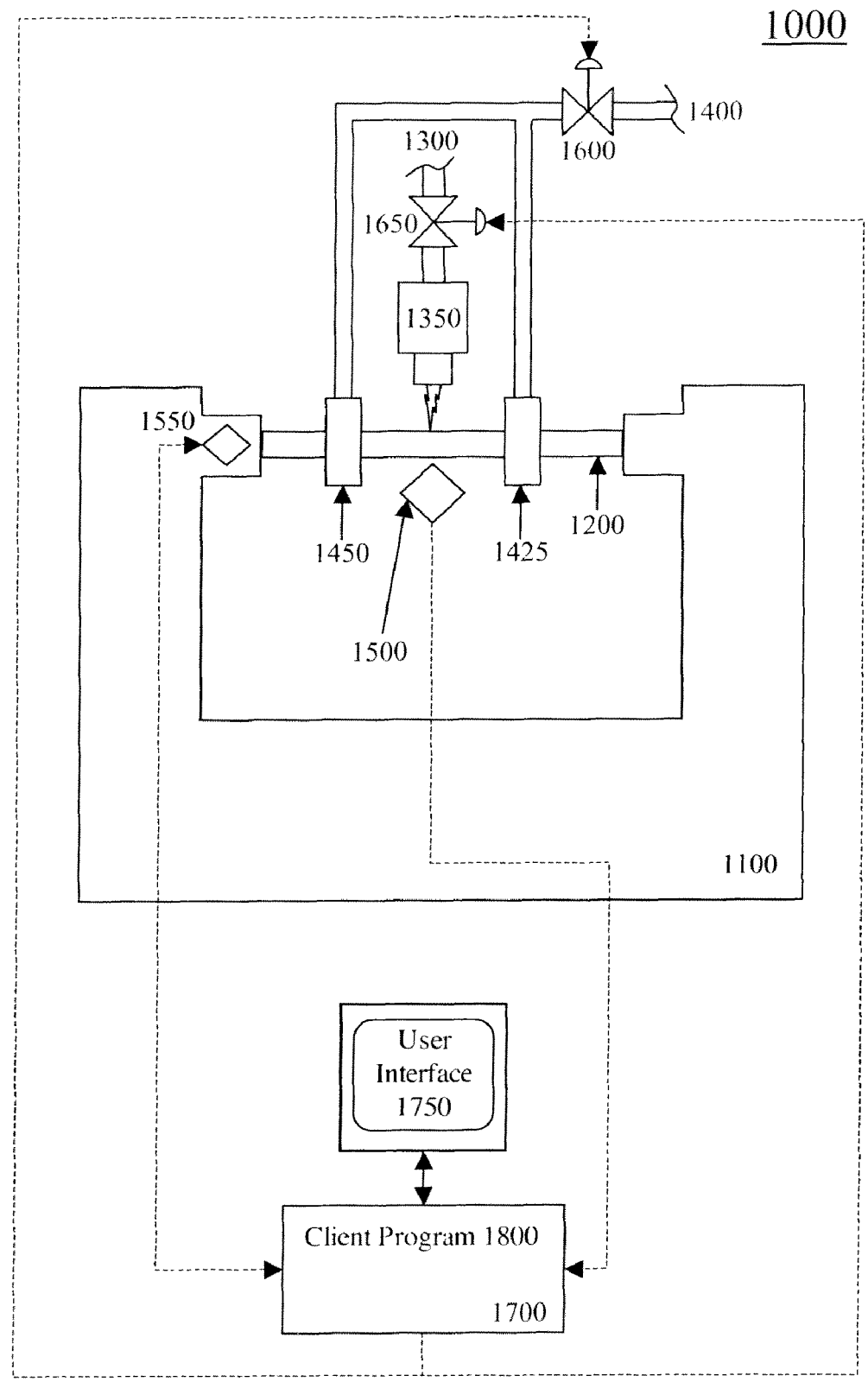
FIG. 1 is a block diagram of an exemplary embodiment of a system 1000.

When the following terms are used substantively herein, the accompanying definitions apply:

a—at least one.

activity—an action, act, step, and/or process or portion thereof.

adapted to—made suitable or fit for a specific use or situation.

adapter—a device used to effect operative compatibility between different parts of one or more pieces of an apparatus or system.

adjacent—in close proximity.

air—the earth's atmospheric gas.

and/or—either in conjunction with or in alternative to.

apparatus—an appliance or device for a particular purpose.

applying—to put to use for a purpose.

approximately—nearly the same as.

area—a surface with determinable boundaries.

automatically—acting or operating in a manner essentially independent of external influence or control. For example, an automatic light switch can turn on upon "seeing" a person in its view, without the person manually operating the light switch.

bearing journal—an area of a shaft adapted to turn within a device that supports, guides, and reduces the friction of motion between fixed and moving machine parts.

below—less than in magnitude.

calculating—computing.

can—is capable of, in at least some embodiments.

carbonizing flame—an oxyacetylene flame in which there is an excess of acetylene.

comprising—including but not limited to.

connect—to join or fasten together.

controlling—directing.

coolant—a first substance adapted to reduce thermal energy in a second substance.

cooling—reducing a temperature of a substance.

coupleable—capable of being joined, connected, and/or linked together.

coupling—linking in some fashion.

data—distinct pieces of information, usually formatted in a special or predetermined way and/or organized to express concepts.
define—to establish the outline, form, or structure of.
determined—found and/or decided upon.
determining—to find out or come to a decision about by investigation, reasoning, or calculation.
device—a machine, manufacture, and/or collection thereof.
diameter—a length of a straight line segment passing through a center of an object and terminating at the periphery thereof.
eddy current proximity probe—a device adapted to detect changes in a magnetic flux density field generated by the presence of a metal object. Those changes in the field, which are detected by the probe, are proportional to the distance to the object. The probe comprises an inductance element that surrounds a ferrite core which when excited by an electrical current, generates a magnetic flux field. The magnetic field, in turn, generates eddy-currents in the object, thereby causing losses in its flux density. The probe detects those losses in the magnetic flux density.
electric heat—thermal energy generated by the flow of electric charge through a conductor.
electric motor—a motion-imparting device powered by electricity.
electrical runout—a property of a rotating shaft causing a proximity probe to give an incorrect indication of a distance between the proximity probe and the rotating shaft.
exceeding—greater than.
fabricated—made or created.
final machining preparing a surface of a mechanical component for use in as a device or a device component.
flooding—an abundant flow of a liquid.
focus—to cause energy to concentrate or converge.
ground—shaped or machined utilizing friction.
heat—energy associated with the motion of atoms or molecules and capable of being transmitted through solid and fluid media by conduction, through fluid media by convection, and through an empty space and/or fluid by radiation.
heating—transferring energy from one substance to another resulting in an increase in temperature of one substance.
heating element—component of a heater or range that transforms fuel or electricity into heat.
indicative—serving to indicate.
information—data that has been organized to express concepts.
information device—any device capable of processing information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator. "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.
infrared temperature scanner—a device adapted to measure an objects temperature based upon emitted radiation having wavelengths between approximately 750 nanometers and approximately 1 millimeter.
install—to connect or set in position and prepare for use.
input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.
lathe—a machine for rotating a piece of material, such as wood or metal, about an axis.
length—a measurement of a greatest dimension of an object.
liquid—a state of matter in which as substance exhibits a readiness to flow.
machine instructions—directions adapted to cause a machine to perform a particular operation or function.
machine readable medium—a physical structure from which a machine can obtain data and/or information. Examples include a memory, punch cards, etc.
may—is allowed and/or permitted to, in at least some embodiments.
memory device—an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.
measured—determined, as a dimension, quantification, and/or capacity, etc. by observation.
method—a process, procedure, and/or collection of related activities for accomplishing something.
network—a communicatively coupled plurality of nodes.
network interface—any device, system, or subsystem capable of coupling an information device to a network. For example, a network interface can be a telephone, cellular phone, cellular modem, telephone data modem, fax modem, wireless transceiver, ethernet card, cable modem, digital subscriber line interface, bridge, hub, router, or other similar device.
non-sensing area—a region of a shaft surface not adjacent to an eddy current proximity probe.
obtaining—the act of receiving, calculating, determining, or computing.
packet—a discrete instance of communication.
plurality—the state of being plural and/or more than one.
predetermined—established in advance.

prevent—keep an event from happening.

processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

profile—a quantitative description of an object.

range—an extent of variation.

rate—a change of a quantity with respect to time.

receiving—obtaining, taking, and/or acquiring.

render—make perceptible to a human, for example as data, commands, text, graphics, audio, video, animation, and/or hyperlinks, etc., such as via any visual, audio, and/or haptic means, such as via a display, monitor, electric paper, ocular implant, cochlear implant, speaker, etc.

regrinding—a second shaping or machining utilizing friction following a first shaping or machining utilizing friction.

repeatedly—again and again: repetitively.

responsive—reacting to an influence and/or impetus.

revolutions per minute—a number of complete rotations about an axis during a time period of one minute.

rotation—an act or process of turning around a center or an axis.

rotating—turning about an axis.

sensing area—a predetermined region of a shaft surface adjacent to which an eddy current proximity probe will be utilized to measure slow roll of the shaft.

set—a related plurality.

shaft—a cylindrical bar adapted to rotate about an axis.

size—physical dimensions, proportions, magnitude, or extent of an object.

slow roll—a sum of instrumentation error, a mechanical runout, and an electrical runout of a rotating shaft.

speed—a linear or rotational velocity.

stator—a stationary portion of a machine.

store—to place, hold, and/or retain data, typically in a memory.

substantially—to a great extent or degree.

supply line—a pipe or tube through which a substance is transferred.

support—to bear the weight of, especially from below.

system—a collection of mechanisms, devices, data, and/or instructions, the collection designed to perform one or more specific functions.

targeted—a desired goal.

temperature—a measure of thermal energy of a substance.

thermal distortion—an undesired change in an object caused by a temperature variation.

threshold—a point that when exceeded produces a given effect or result.

time interval—an amount of time between to specified instants, events, or states.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

value—an assigned or calculated numerical quantity.

via—by way of and/or utilizing.

DETAILED DESCRIPTION

Certain exemplary embodiments comprise a method comprising a plurality of activities comprising, for a shaft of an electric motor, the shaft comprising a runout sensing area: determining an electrical runout value for the runout sensing area; rotating the shaft; and/or heating the runout sensing area of the shaft sufficient to reduce the electrical runout value.

Certain exemplary embodiments comprise a system comprising: a heating element; and a control system adapted to control a heating of a shaft to a temperature within a predetermined temperature range for a predetermined time interval, the heating sufficient to reduce an electrical runout value of the shaft, the heating occurring while the shaft is rotating.

Certain exemplary embodiments comprise a method comprising a plurality of activities comprising: receiving information indicative of a first runout value for a shaft; automatically determining a temperature range for heating the shaft to reduce the first runout value; and/or automatically determining a time interval for heating the shaft to reduce the first runout value.

Figure 4:
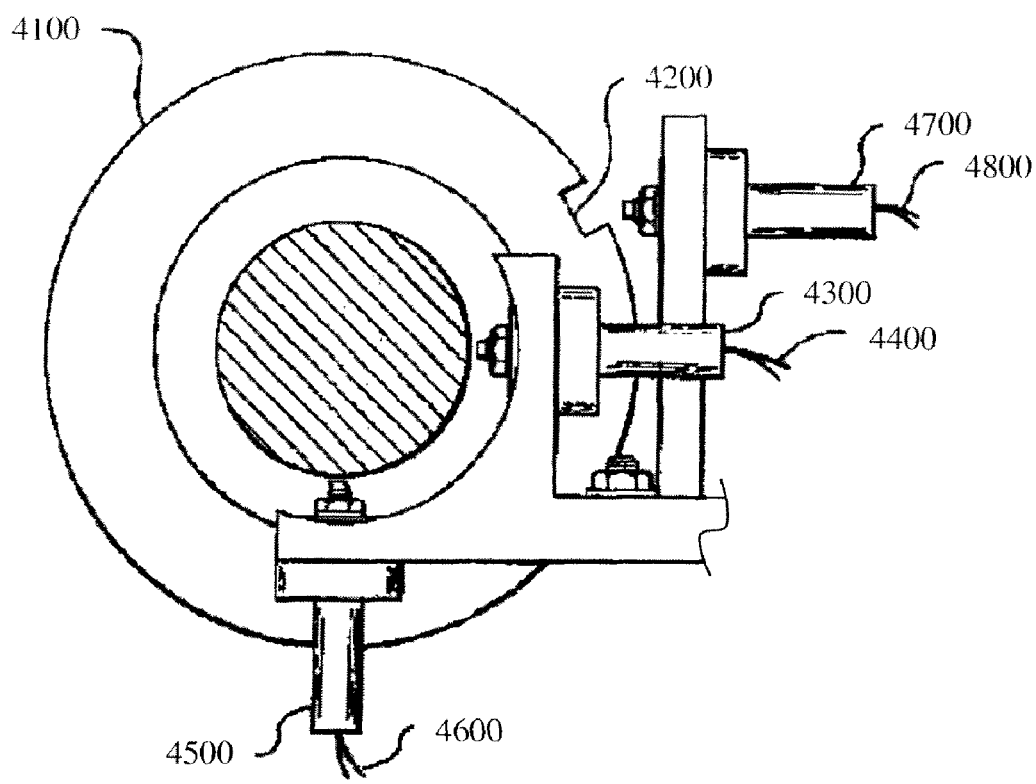
FIG. 4 is a sectional view of a shaft mounted on a system 4000.

FIG. 4 is a sectional view of a shaft 4100 in a system 4000. System 4000 can be adapted to measure a slow roll value and/or an electrical runout value of a sensing area of shaft 4100. Shaft 4100 can be releasably mounted to system 4000, such as by bolting bearings mechanically coupled to shaft 4100 to a frame associated with system 4000. System 4000 can comprise a speed sensor and/or controller adapted to rotate shaft 4100 at a rotational speed sufficiently slow to measure a slow roll value. A rotational speed that is sufficiently slow to measure the slow roll value can be approximately, in revolutions per minute (rpm), 150, 131.3, 104.9, 101, 98.6, 67.4, 45, 33.3, 25, 18.7, 15, 12.9, 9, 6.5, 3.3, 1.2, 0.45, and/or any other value or subrange therebetween.

Shaft 4100 can comprise a sensing area. The sensing area can be associated with proximity probes 4300, 4500, which can be eddy current proximity probes. Proximity probes 4300, 4500 can be probes produced by any proximity probe manufacturer. For example, either of proximity probes 4300, 4500 can be a series 3300 proximity probe or a series 4000 proximity probe manufactured by Bently Nevada of Minden, Nev. Proximity probes 4300, 4500 can be adapted to measure a slow roll value associated with shaft 4100. An electrical runout value associated with the sensing area can be determined from the slow roll value.

For example, the electrical runout value can be determined by comparing a signal from proximity probe 4300 to a signal from proximity probe 4500 mounted at right angles to each other with respect to shaft 4100, each of which probes can operate and/or be excited at a different frequency. Probe 4300 or probe 4500 can be mounted with an orientation that is substantially the same as a probe adapted to be mounted in a motor comprising shaft 4100. An angular position sensor 4700, such as an angular position sensor manufactured by Bently Nevada of Minden, Nev., can provide a correlation for a signal from each of proximity probes 4300, 4500 to a particular angular location of shaft 4100. For example, angular position sensor 4700 can detect a shaft mark 4200 and can provide timing information indicative of angular displacements of shaft 4100 relative to shaft mark 4200. Signals from proximity probes 4500, 4600 can be provided to an information device communicatively coupled to probes 4300, 4500 by leads 4400, 4600. Signals from angular position sensor 4700 can be provided to the information device communicatively coupled to angular position sensor 4700 via lead 4800. The information device can process the signals and provide a slow roll value and/or an electrical runout value associated with the sensing area of shaft 4100.

The information device can be adapted to determine a size and/or location of a sensing area of shaft 4100. The sensing area size can be determined and/or calculated based upon a length and/or diameter of shaft 4100 and/or other characteristics of shaft 4100 and/or proximity probes 4300, 4500.

FIG. 1 is a block diagram of an exemplary embodiment of a system 1000, which can comprise a shaft-rotating device 1100. For example, shaft-rotating device 1100 can be adapted from a lathe, boring machine, broaching machine, facing machine, grinder, mill, press drill, shaper, tapping machine, and/or threading machine, etc. Shaft-rotating device 1100 can comprise steady rests to support a weight of a shaft 1200.

Shaft-rotating device 1100 can comprise a speed sensor and/or controller 1550. Speed sensor and/or controller 1550 can be adapted to measure and/or control a rotational speed of shaft 1200 mounted on shaft-rotating device 1100. Speed sensor and/or controller 1550 can be adapted to rotate shaft 1200 at approximately a predetermined and/or targeted rotational speed, such as a speed determined appropriate for a process involving heating the shaft to reduce electrical runout.

The targeted rotational speed for heating can be approximately, in rpm, 199, 151.8, 112.1, 107, 95.3, 77.1, 48, 31.8, 18.6, 25, 15, 11.3, 9, 5.4, 3.1, 1.8, 0.76, and/or any other value or subrange therebetween.

Shaft-rotating device 1100 can be adapted to receive shaft 1200. Shaft 1200 can be releasably attached to shaft-rotating device 1100 in order to reduce an electrical runout value of shaft 1200. Shaft 1200 can be any shaft from a rotating machine such as a fan, pump, electric motor, gearbox, rotary mixer, centrifuge, and/or agitator, etc. In certain exemplary embodiments, shaft 1200 can be a shaft associated with a new rotating machine. In certain exemplary embodiments, shaft 1200 can be a shaft associated with a previously operated rotating machine.

Shaft 120 can be comprised of any metal such as an alloy steel. For example, shaft 1200 can be comprised of any alloy steel, such as an alloy steel from series 1000, 4000, 6000, or 9000, etc. For example, shaft 1200 can be comprised of a steel selected from the set of 1045, 4130, 4140, or 4340. In certain exemplary embodiments, shaft 1200 can comprise vacuum degassed steel.

Responsive to a detected electrical runout value associated with shaft 1200 exceeding a predetermined threshold, shaft 1200 can be heated in order to reduce the electrical runout value of the sensing area.

System 1000 can comprise a heating element 1350 that can be adapted to heat shaft 1200 in order to reduce an electrical runout value associated with the sensing area. Heating element 1350 can heat shaft 1200 via electrical induction heating, conductive heating, heating via a neutral flame, heating via a slightly carbonizing flame, and/or heating via a carbonizing flame, etc. A slightly carbonizing flame can be described as comprising a blue envelope and a short bright inner core. In certain exemplary embodiments, when utilizing a flame for heat, the heat can be applied by oscillating the flame. In certain exemplary embodiments, when heating element 1350 utilizes a flame, the flame can be positioned a distance away from shaft 1200, in inches, of approximately 0.5, 0.75, 0.8, 0.9, 1, 1.3, 1.5, 1.6, 1.9, 2, 2.01, 2.4, 3.1, 3.45, 3.6, 4.01, and/or any value or subrange therebetween.

Heating element 1350 can heat shaft 1200 to a temperature and/or temperature range sufficient to reduce the electrical runout value of the sensing area of shaft 1200. For example, system 1100 can be adapted to heat shaft 1200 to a temperature, in degrees Fahrenheit, of approximately 399.9, 487, 522.2, 587.6, 600, 645.5, 699, 703.7, 778.9, 800, 801.1, 850, 922, 1000, 1200, 1321, 1400, and/or any value or subrange therebetween.

Heating element 1350 can apply heat to shaft 1200 for a time interval in minutes of approximately 2.01, 3.9, 4.12, 4.5, 5, 5.7, 6, 6.11, 6.5, 7.2, 7.65, 8, 8.4, 9, 10, 10.3, 11.2, 11.9, 12.5, 15, and/or any value or subrange of time therebetween.

A flow of heat can be regulated and/or controlled via changing a flow of energy from energy source 1300. Energy source 1300 can be a supply of electrical energy, thermal energy, and/or chemical energy (e.g., hydrocarbon based gaseous or liquid fuels). Energy from energy source 1300 can be controlled via regulator 1650. Regulator 1650 can be adapted for automatic and/or manual control of energy from energy source 1300. A design of regulator 1650 can depend upon the nature of energy source 1300. For example, in embodiments utilizing electrical energy, regulator 1650 can be any electrical device adapted to control a flow of electrical current such as a potentiometer, variable R-C circuit, variable inductor, and/or tuning circuit, etc. In embodiments utilizing a gaseous or liquid fuel, regulator 1650 can be a control valve.

A temperature of the sensing area of shaft 1200 can be monitored via an infrared temperature scanner 1525.

While applying heat via heating element 1350, other areas of shaft 1200 can be cooled. For example, collars 1425 and 1450 can be releasably attached to shaft 1200. In certain exemplary embodiments, collars 1425, 1450 can be comprise flanges that can be bolted together to releasably attach collars 1425, 1450 to shaft 1200. In certain exemplary embodiments, collars 1425, 1450 can be single piece collars adapted to slidably mount on shaft 1200. A liquid coolant can be supplied to collars 1425, 1450 to cool shaft 1200. For example, the liquid coolant can be applied to areas of shaft 1200 adjacent to the sensing area. The liquid coolant can be any fluid adapted to provide an adequate cooling of shaft 1200, such as water, a glycol based fluid, an oil based fluid, a silicon based fluid, and/or a synthetic aromatic fluid, etc. Applying a liquid coolant to cool shaft 1200 in areas other than the sensing area can resist a thermal distortion of shaft 1200.

A flow of liquid coolant to cool shaft 1200 can be regulated by a control valve 1600. Control valve 1600 can be adapted to adjust a flow of liquid coolant to cool shaft 1200 sufficiently to resist thermal distortion of the shaft, while heating the sensing area of shaft 1200 sufficiently to reduce electrical runout.

In certain exemplary embodiments, system 1000 can comprise a control system comprising an information device 1700, which can comprise a client program 1800 and a user interface 1750. Information device 1700 can receive information regarding shaft 1200 via sensors and/or inputs received from a user. Information regarding shaft 1200 can comprise a metallurgical composition, length, diameter, profile, electrical runout value prior to heat treatment and/or maximum desired electrical runout value, etc.

Client program 1800 can be adapted to determine the sensing area, which can vary depending on the type of probe used, the shaft diameter, etc.

Client program 1800 can be adapted to determine the temperature range and/or the time interval for heating shaft 1200 to reduce electrical runout. The temperature range can be determined based upon shaft metallurgy, an electrical runout value, a targeted threshold for reducing the electrical runout value, and/or other characteristics of shaft 1200. A maximum temperature for heating shaft 1200 can be determined from shaft metallurgy. The maximum temperature can be determined in order to resist substantially impairing physical properties of shaft 1200 as a result of grain structure changes. For example, a database can be stored in a memory device communicatively coupled to information device 1700. The information device can comprise information related to metallurgical alloys and time-temperature transformation curves associated with particular metallurgical alloys.

The time interval for heating shaft 1200 can be determined based upon the metallurgical properties of shaft 1200 and/or other characteristics of shaft 1200. The time interval can be related to the temperature range in that the time interval can be selected to resist substantially impairing physical properties of shaft 1200 as a result of grain structure changes. Thus, at a higher temperature range for heating shaft 1200, the time interval can be reduced as compared to a lower temperature range.

Client program 1800 can be adapted to control regulator 1650 responsive to a temperature and/or or a rate of change of temperature measured by infrared temperature scanner 1525. Controlling regulator 1650 can control the temperature of the slow roll sensing area with a temperature range such as for a period of time within a time interval.

In certain exemplary embodiments, client program 1800 can be adapted to determine a targeted rotational speed for machine 1100 to rotate shaft 1200 for heating shaft 1200 to reduce electrical runout. The targeted rotational speed can be determined based upon characteristics of shaft 1200.

Client program 1800 can be adapted to determine a cooling rate for the slow roll sensing area of the shaft. The cooling rate can be determined based upon metallurgy and/or other characteristics of shaft 1200. In certain exemplary embodiments, energy flow from via heating element 1350 can be reduced gradually to achieve a targeted cooling rate.

Client program 1800 can be adapted to control liquid coolant flow to shaft 1200, via adjusting control valve 1600, responsive to a flow of heat to heating element 1350 and/or information obtained by infrared temperature scanner 1525.

In certain exemplary embodiments, client program 1800 can be adapted to adaptively learn and improve performance of system 1000. For example, client program 1800 can receive electrical runout measurements before and after a heat treatment of shaft 1200 and/or information related to strength properties of shaft 1200. Client program 1800 can be adapted to correlate variables measured during heat treatment to objective results regarding electrical runout and shaft strength properties. Client program 1800 can be adapted to randomly and/or heuristically vary parameters associated with heat treatment such as the temperature range, time interval, shaft metallurgy, and/or flow of liquid coolant. Client program 1800 can use an optimization algorithm to seek optimal points on a response surfaces associated with heat treatment to reduce electrical runout in shafts. For example, the optimization algorithm can use a linear programming technique, golden search algorithm, Hooke and Jeeves' method, and/or Nelder and Mead's method, etc.

User interface 1750 can be adapted to render information regarding reducing the electrical runout value of shaft 1200. For example, user interface 1750 can render information regarding a detected slow roll value or an electrical runout measurement. User interface 1750 can render information regarding heating shaft 1200, such as a temperature detected by infrared temperature scanner 1525, a flow of heat to heating element 1350, and/or a liquid coolant flow to collars 1425, 1450. User interface 1750 can be adapted to render information regarding the temperature range and the time interval.

Figure 2:
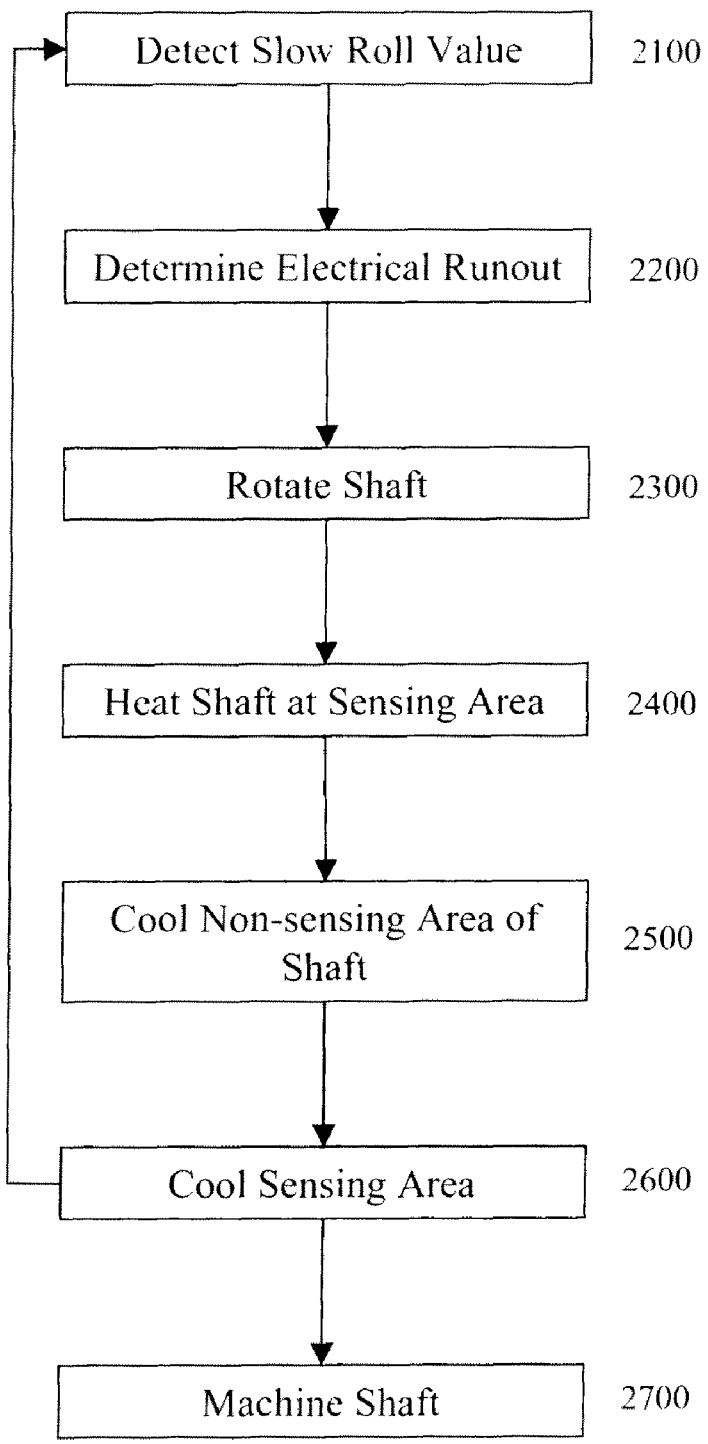
FIG. 2 is a flowchart of an exemplary embodiment of a method 2000.

FIG. 2 is a flowchart of an exemplary embodiment of a method 2000. At activity 2100, a slow roll value associated with a sensing area can be measured, detected, and/or received. The sensing area can be a slow roll sensing area and/or a runout sensing area of a shaft. In certain exemplary embodiments, the shaft can be a shaft of an electric motor. The slow roll value can be detected via a proximity probe, such as an eddy current proximity probe. In certain exemplary embodiments, the slow roll value can be compared to a predetermined threshold. If the slow roll value is below the predetermined threshold, the shaft can be utilized without reducing the slow roll value. If the slow roll value exceeds a predetermined threshold, activities can continue at activity 2200.

At activity 2200, an electrical runout value associated with the sensing area can be determined. The electrical runout value can be determined based upon the slow roll value and information indicative of a mechanical runout associated with the slow roll value. In certain exemplary embodiments, the electrical runout value can be compared to a predetermined threshold. If the electrical runout value is below the predetermined threshold, the shaft can be utilized without reducing the electrical runout value. If the electrical runout value exceeds a predetermined threshold, activities can continue at activity 2300.

At activity 2300, the shaft can be rotated. In certain exemplary embodiments, the shaft can be rotated at a speed of less than approximately 30 revolutions per minute in order to heat the sensing area to reduce the electrical runout value of the shaft.

At activity 2400, the shaft can be heated at the sensing area. The sensing area of the shaft can be heated to approximately within a predetermined temperature range for approximately a predetermined time interval, the heating of the shaft can be sufficient to reduce the electrical runout value. In certain exemplary embodiments, a fire extinguisher can be provided for safety purposes.

At activity 2500, a non-sensing area of the shaft can be cooled via a liquid coolant. Cooling the non-sensing area of the shaft can resist a thermal distortion of the non-sensing area. For example, a coolant line can be positioned on a hearing journal area of the shaft, which can flood the bearing journal area with a liquid coolant during heating activity 2400. Certain exemplary embodiments can comprise water/coolant hoses and/or a sump truck for providing liquid coolant.

At activity 2600, the sensing area can be cooled. In certain exemplary embodiments, the shaft can be air cooled, at a controlled or uncontrolled rate, such as to a temperature of less than approximately 200 degrees Fahrenheit.

Activity 2100 through activity 2600 can be repeated until a measured electrical runout value and/or slow roll value is less than a predetermined threshold.

At activity 2700, the shaft can be ground and/or machined. In certain exemplary embodiments, sensing surfaces of the shaft can be ground to within approximately five thousandths of an inch of a final radius prior to heating the shaft for reducing electrical runout. Grinding and/or machining the shaft can prepare the shaft for use in a machine such as an electric motor.

Figure 3:
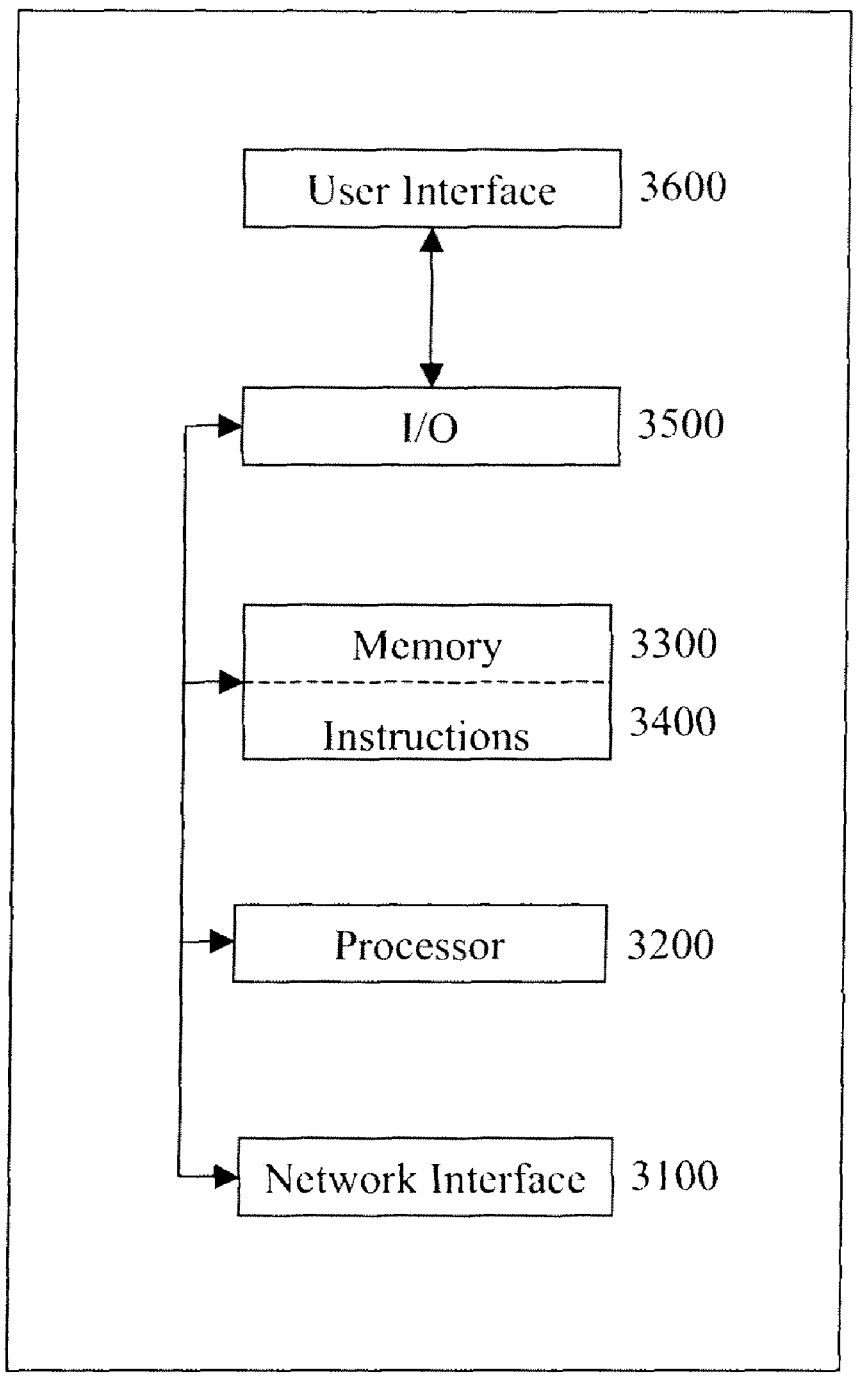
FIG. 3 is a block diagram of an exemplary embodiment of an information device 3000.

FIG. 3 is a block diagram of an exemplary embodiment of an information device 3000, which in certain operative embodiments can comprise, for example, information device 1700 of FIG. 1. Information device 3000 can comprise any of numerous components, such as for example, one or more network interfaces 3100, one or more processors 3200, one or more memories 3300 containing instructions 3400, one or more input/output (I/O) devices 3500, and/or one or more user interfaces 3600 coupled to I/O device 3500, etc.

In certain exemplary embodiments, via one or more user interfaces 3600, such as a graphical user interface, a user can view a rendering of information related to heating a shaft to reduce electrical runout of a shaft.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, such as via an explicit definition, there is no requirement for the inclusion in any claim herein (or of any claim of any application claiming priority hereto) of any particular described or illustrated characteristic, function, activity, or element, any particular sequence of activities, or any particular interrelationship of elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

What is claimed is:

1. A non-transitory computer-readable storage medium having program instructions tangibly stored thereon executable by a processor to perform a method comprising:
   receive and store slow roll information indicative of a first electrical runout value of a sensing area of a shaft of an electric motor;
   automatically determine a temperature range for heating the sensing area of the shaft to reduce the first electrical runout value in response to stored information concerning shaft material metallurgic properties;
   automatically determine a time interval for heating the sensing area of the shaft to reduce the first electrical runout value in response to stored information concerning shaft material time-temperature transformation; and
   automatically heat the sensing area of the shaft during shaft rotation sufficient to reduce the first electrical runout value based on the temperature range and heating time interval determinations.

2. The computer-readable medium of claim 1, further comprising:
   instructions stored on the medium for receiving information indicative of a diameter of the shaft.

3. The computer-readable medium of claim 1 further comprising:
   instructions stored on the medium for receiving information indicative of a length of the shaft.

4. The computer-readable medium of claim 1, further comprising:
   instructions stored on the medium for receiving information indicative of a profile of the shaft.

5. The computer-readable medium of claim 1, further comprising:
   instructions stored on the medium for determining a size of a slow roll sensing area of the sensing area of the shaft.

6. The computer-readable medium of claim 1, further comprising:
   instructions stored on the medium for determining a targeted threshold for reducing the first electrical runout value of the slow roll sensing area of the shaft.

7. The computer-readable medium of claim 1, further comprising:
   instructions stored on the medium for receiving a temperature of the slow roll sensing area of the shaft.

8. The computer-readable medium of claim 1, further comprising:
   instructions stored on the medium for automatically controlling the temperature of the slow roll sensing area of the shaft within the temperature range.

9. The computer-readable medium of claim 1, further comprising:
   instructions stored on the medium for automatically controlling the temperature of the slow roll sensing area of the shaft within the temperature range for a period of time within the time interval.

10. The computer-readable medium of claim 1, further comprising:
    instructions stored on the medium for automatically cooling a non-sensing area of the shaft.

11. The computer-readable medium of claim 1, further comprising:
    instructions stored on the medium for determining a targeted rotational speed for the electric motor shaft for heating the shaft to reduce electrical runout.

12. The computer-readable medium of claim 1, further comprising:
    instructions stored on the medium for determining a targeted rotational speed for the electric motor shaft for heating the shaft to reduce electrical runout; and
    instructions stored on the medium for automatically controlling rotation of the shaft at approximately the targeted rotational speed.

13. The computer-readable medium of claim 1, further comprising:
    instructions stored on the medium for determining a cooling rate for the slow roll sensing area of the shaft.

14. The computer-readable medium of claim 1, further comprising:
    instructions stored on the medium for automatically controlling a cooling rate of the slow roll sensing area of the shaft.

15. The computer-readable medium of claim 1, further comprising:
    instructions stored on the medium for automatically monitoring the temperature of the shaft during cooling.

16. The computer-readable medium of claim 1, further comprising:
    instructions stored on the medium for receiving information indicative of a second electrical runout of the slow roll sensing area of the shaft.

17. The computer-readable medium of claim 1, further comprising:
    instructions stored on the medium for determining that the first electrical runout value exceeds a predetermined threshold.

18. The computer-readable medium of claim 1, further comprising:
    instructions stored on the medium for determining that a second electrical runout is below a predetermined threshold.

* * * * *